Sept. 28, 1943.   G. G. McNAMARA, JR   2,330,299
VEHICLE
Filed Feb. 12, 1942
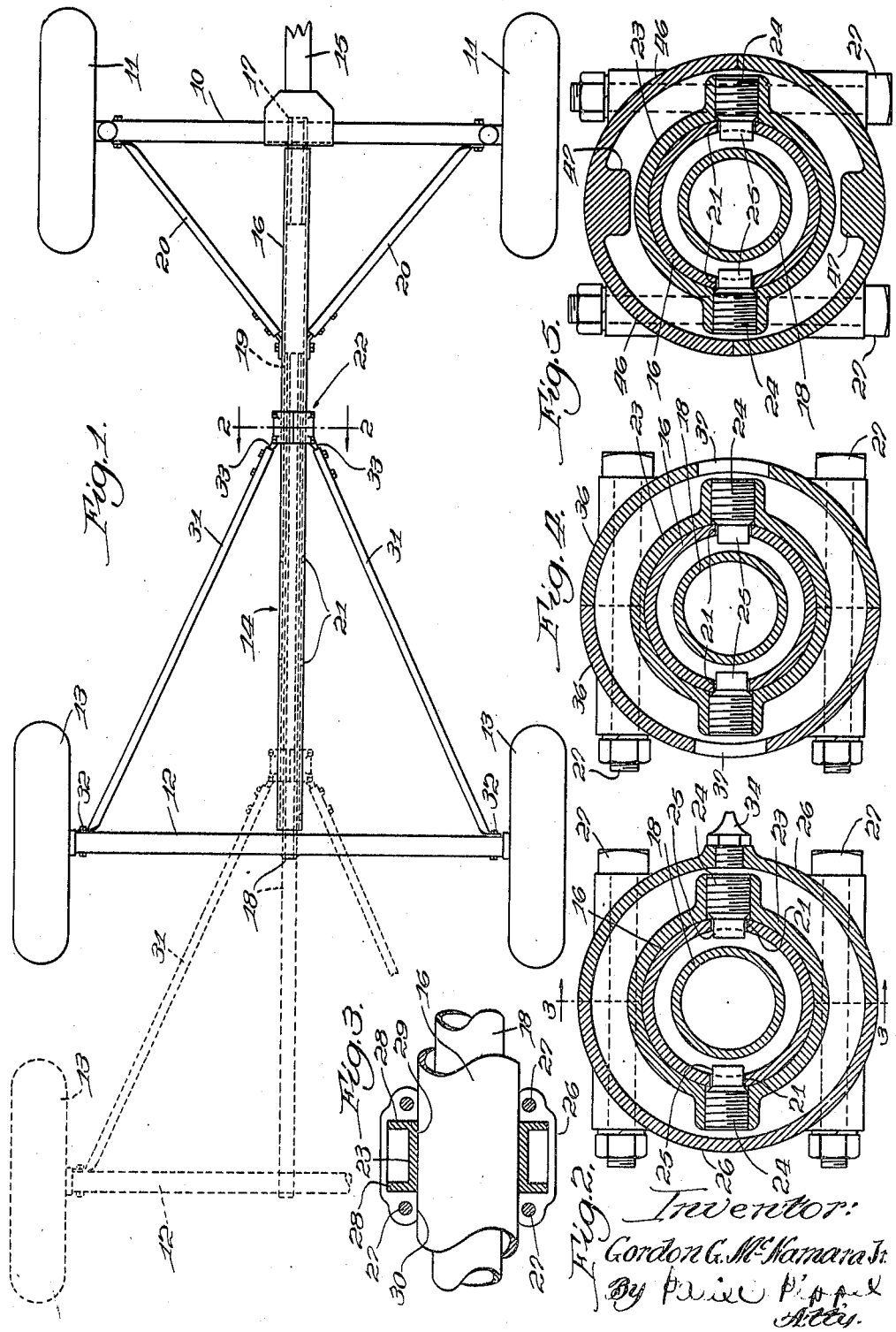

Patented Sept. 28, 1943

2,330,299

UNITED STATES PATENT OFFICE 2,330,299

VEHICLE

Gordon G. McNamara, Jr., Chicago, Ill., assignor to International Harvester Company, a corporation of New Jersey Application February 12, 1942, Serial No. 430,666

8 Claims. (Cl. 280—141)

This invention relates to a vehicle and particularly to a vehicle of the type commonly known as an all-purpose truck or trailer.

In a trailer of the type referred to it is common to provide a construction including a pair of longitudinally spaced, wheeled axles connected together by reach means permitting relative oscillation between the axles, so that the vehicle wheels can adapt themselves to variations in ground contour. It is also common to provide the reach means with a pair of telescoping reach members arranged to permit adjustment thereof for varying the wheel base of the trailer. Various problems arise in the construction of a trailer of this type inasmuch as the construction requires expensive design and the elimination of unnecessary structural members so that the completed vehicle will be light in weight and comparatively inexpensive to maintain.

According to the present invention, the principal object is the provision of an improved truck or trailer having the desirable characteristics referred to above.

An important object is to provide a tailer construction including a pair of spaced axles and reach means, the reach means being adjustable to vary the wheel base between the axles and being also arranged for relative angular movement so that oscillation between the axles is permitted.

Another object is to provide a vehicle construction in which the hounds take the draft forces, preferably independently of the reach means.

Another object is to provide an improved construction for connecting the reach members together for relative angular movement and for relative longitudinal adjustment.

Still another object is to provide a bearing means providing a swivel between the front and rear axles for relative oscillation of said axles.

Briefly, and specifically, these and other important objects and features of the invention are achieved in one preferred construction by the provision of a pair of transverse axles disposed in longitudinally spaced relation by a pair of tubular, telescopic reach members, one reach member being secured to each axle. The reach members are arranged for longitudinal adjustment to vary the wheel base between the axles and are further interconnected by an improved swivel or bearing means to permit relative angular movement between the axles about the longitudinal axis of the tubular members. The bearing means is connected to one of the reach members and is also connected to a pair of braces or hounds which are in turn connected to the rear axle, these hounds serving as the sole means for taking draft forces.

A complete understanding of the invention and certain modified forms thereof may be had from the following detailed description taken in connection with the accompanying sheet of drawing, in which:

Figure 1 is a plan view of a preferred form of truck or trailer structure, that portion of the figure shown in dotted lines indicating an extension of the reach member for variation in the trailer wheel base;

Figure 2 is an enlarged sectional view taken along the line 2—2 of Figure 1 and showing the improved bearing or swivel structure providing for the interconnection of the reach members;

Figure 3 is a fragmentary sectional view, reduced in scale and taken along the line 3—3 of Figure 2, showing further details of the relation between the reach members and the bearing or swivel means; and Figures 4 and 5 are, respectively, views of two modified forms of bearing or swivel means, each view representing a transverse section similar to that in the illustration shown in Figure 2.

The vehicle chosen for the purposes of illustration and exposition is of the type commercially known as a rubber-tired, all-purpose trailer and is, as well known to those skilled in the art, utilized in the hauling of agricultural products, for example, behind a truck or tractor or similar draft vehicle. The trailer, as shown, includes a front axle 10 carrying wheels 11, a rear axle 12 carrying wheels 13, and a longitudinally disposed reach means generally indicated by the numeral 14. The front axle 10 is connected in any suitable manner with a draft tongue 15, only a portion of which is shown.

A preferred form of reach means includes an outer tubular reach member 16 preferably rigidly carried at its forward end by or conneced to the front axle 10. The connecting means illustrated includes a short length of pipe or other tubular stock 17 welded or otherwise secured to the axle 10 and press-fitted or telescoped and bolted into the forward end of the reach member 16. The reach member 16 extends substantially entirely between the axles 10 and 12 when the wheel base of the trailer is shortest. The reach means includes a second or inner reach member 18 preferably rigidly secured, as by welding or bolting, to the rear axle 12. The diameter of the reach or tube 18 is considerably smaller than that of the reach 16, and the two reaches are telescopically fitted together. The forward end of the inner reach 18 carries a short tubular member 19 which is press-fitted or otherwise secured to the outer diameter of the reach 18 and provides a bearing slidable in the inner diameter of the outer reach member 16. From the description thus far it will be understood that the outer reach 16 is secured to the front axle 10 and that the inner reach 18 is secured to the rear axle 12, the two reaches being thus disposed or arranged for relative longitudinal and angular movement. The outer reach 16 is further secured to the front axle 10 by a pair of rigidly attached braces or hounds 20.

As best shown in Figures 1 and 2, the rearward portion of the outer reach 16 is provided with a plurality of pairs of transversely alined openings 21. These openings provide means for the attachment to the outer reach member 16 of means for connecting that reach to the rear axle 12. This latter means preferably takes the form of a swivel or bearing means, generally indicated at 22.

As best shown in Figure 2, the bearing means includes an inner collar 23 which surrounds the reach 16. Transversely opposed portions of the collar are enlarged and threaded and respectively carry locking means, preferably in the form of a pair of set screws 24. Each locking means or screw includes a shank portion 25 engageable with a selected opening 21 in the reach 16. It will be understood that the collar 23 may be secured to the reach 16 in any one of the plurality of positions designated by the locations of the pairs of openings 21.

A second part of the bearing or swivel means includes an external sleeve or housing comprising a pair of complementary bearing halves 26 adapted to be secured together by bolts 27 to form a bearing unit surrounding the collar 23 and proximate portions of the reach 16. As best shown in Figure 3, the collar 23 includes a pair of longitudinally spaced, opposed radial flanges 28, the outer face of each of which provides a radial bearing surface adapted to engage respectively a complementary bearing surface 29 formed in the interior of the assembled bearing halves 26. Those portions of the bearing halves 26 which surround the reach 16 provide cylindrical bearing surfaces 30 adapted to maintain the bearing unit rotatably upon the reach. The bearing structure just described provides that the collar 23 is rigidly carried by the reach 16 and is held by the locking means 24 against both longitudinal and angular movement with respect to the reach. The bearing unit provided by the assembly 26, when mounted on the collar 23, is held against longitudinal movement with respect to the reach 16 but may have angular movement with respect to the reach about the longitudinal axis of the reach. The bearing surfaces 28 and 29 of the parts 23 and 26, respectively, take endwise thrust between the parts and apply such thrust to the front reach 16. The bearing surfaces 30 of the bearing unit 26 mount the bearing unit in a freely rotatable manner on the reach 16.

In the description thus far it will be noted that there is no connection between the front and rear axles 10 and 12 other than that provided by the inner reach 18. It will be further noted that the reach 18 is only slidably and rotatably associated with the front axle 10 through the medium of the front or outer reach 16. Accordingly, it will be seen that draft forces applied to the forward end of the trailer are not transmitted to the rear axle 12 through the inner reach 18. However, according to the present invention, the means for transmitting draft forces between the front half of the trailer and the rear axle comprise a pair of rear brace or hound members 31. As best shown in Figure 1, each hound is rigidly secured at 32 to an outer portion of the rear axle 12. The forward end of each hound is rigidly secured by bracket means 33 to the bearing unit comprising the complementary bearing halves 26. Since the bearing unit is carried by the collar 23 on the reach 16, the draft forces are applied through the hounds 31 to transversely spaced outermost portions of the rear axle 12. The structural relationship between the reaches 16 and 18 is such that these members are subjected to only vertical forces, such as may be applied by a load on the trailer.

As has been stated previously, the relationship between the collar 23 and parts 26 is such as to provide a bearing which is rotatable with respect to the front reach 16. One of the bearing halves 26 may be, and is here shown as, provided with a suitable lubricant fitting 34 through which lubricant may be supplied to the bearing surfaces 28, 29, and 30. Since the bearing is rotatable with respect to the reach 16 and since the reach 18 is also rotatable with respect to the outer reach, it will be seen that the entire rear of the trailer, including the axle 12, the hounds 31, and the bearing parts 26, may oscillate with respect to the forward portion of the trailer about the longitudinal axis through the telescopic reaches 16 and 18.

In a modified form of bearing construction, as shown in Figure 4, the outer complementary bearing halves have been designated by the numeral 36, the associated parts bearing the same reference numerals used heretofore. This modified bearing differs from that previously described in that each bearing half 36 is provided with an opening 37 in its peripheral wall, this opening, during level relationship between the axles 10 and 12, being transversely alined with the proximate locking means or set screw 24. In this manner access is provided to the locking means so that these means may be loosened or removed to permit adjustment of the collar 23 on the reach 16. In the structure shown in Figures 1, 2 and 3, it is necessary that the bearing halves 26 be disassembled by the removal of the bolts 27, thus providing access to the locking means 24.

In the further modification shown in Figure 5, the complementary bearing halves are indicated by the numeral 46, the other parts bearing the same reference characters used previously. In this structure each of bearing halves 46 includes an inwardly projecting portion or boss 47. As will be readily apparent from the drawing, the bosses 47 are respectively adapted to engage the enlarged portions of the collar 23 that carry the locking means 24, thus limiting relative angular movement between the front and rear axles. In other respects the structures shown in Figures 2, 4, and 5 are substantially similar, it being understood that the lubricant fitting 34 may be supplied in either of the other cases, or that the stop means, comprising the boss 27, may be provided in the other cases, or that any other combination of the independent features of each modified form may be made.

From the foregoing description it will be seen that an improved vehicle construction has been provided, the particular features of the construction being especially adapted to the type of vehicle in which the required characteristics are an adjustable wheel base and relative oscillation between the axles. As previously stated such a vehicle is represented by the well-known all purpose truck or trailer. It will be understood, of course, that the various features disclosed are readily adapted to other uses and that further modifications and alterations may be made in the preferred forms of the invention illustrated without departing from the spirit and scope of the invention as defined in the appended claims.

What is claimed is:

1. A vehicle comprising first and second transverse axles; longitudinal reach means between said axles including longitudinal inner and outer, telescopic and relatively angularly movable reach members; means securing the outer reach member to the first axle; means securing the inner reach member to the second axle; a collar carried by the outer reach member for adjustment longitudinally of said reach member; means for securing said collar and outer reach member against relative longitudinal movement at selectable points along said reach member; means associated with said collar for angular movement with respect to the outer reach member; and means connecting said means to the second axle.

2. A vehicle comprising first and second transverse axles, reach means disposed longitudinally between the axles and including first and second relatively extendable and relatively angularly movable reach members, means connecting the first reach member to the first axle, means connecting the second reach member to the second axle, a support carried by the first reach member for movement angularly with respect thereto, means adjustably fixing said support against longitudinal movement with respect to said reach member, and means connecting said support and the second axle.

3. A vehicle comprising front and rear transverse axles, a longitudinal, central reach between the axles and including a first and second reach part connected together for relative longitudinal adjustment, means connecting the first reach part to the first axle in both draft-exerting and load-supporting relation, means supporting the other reach part at a central portion of the second axle in only load-supporting relation, and means connecting the first reach part and the second axle in draft-exerting relation.

4. A vehicle comprising front and rear transverse axles, a longitudinal, central reach between the axles and including a first and second reach part connected together for relative longitudinal adjustment, means connecting the first reach part to the first axle, means mounting the second reach part and a central portion of the second axle in longitudinally separable relation, and a pair of hound members connected respectively in draft-exerting relation between the first reach part and opposite outer portions of the second axle.

5. A vehicle comprising first and second transverse axles; longitudinal reach means between said axles including longitudinal inner and outer, telescopic and relatively angularly movable reach members; means securing the outer reach member to the first axle; means securing the inner reach member to the second axle; a collar carried by the outer reach member for adjustment longitudinally of said reach member; means for securing said collar and outer reach member against relative longitudinal movement at selectable points along said reach member; means carried by said collar for angular movement with respect to the outer reach member; and including a pair of complementary bearing halves removably secured together surrounding said collar; and a pair of hounds secured respectively between the bearing halves and the second axle.

6. A vehicle comprising first and second transverse axles; longitudinal reach means between said axles including longitudinal inner and outer, telescopic and relatively angularly movable reach members; means securing the outer reach member to the first axle; means securing the inner reach member to the second axle; a collar carried by the outer reach member for adjustment longitudinally of said reach member; means carried by the collar for locking the collar to the outer reach member against relative longitudinal movement at selectable points along said reach member; a pair of complementary bearing halves secured together and encircling the collar, the locking means and an adjacent portion of the outer reach member and associated with the outer reach member for angular movement with respect thereto; and a pair of hounds connected respectively between the second axle and the bearing halves.

7. A vehicle comprising first and second transverse axles; longitudinal reach means between said axles including longitudinal inner and outer, telescopic and relatively angularly movable reach members; means securing the outer reach member to the first axle; means securing the inner reach member to the second axle; a collar carried by the outer reach member for adjustment longitudinally of said reach member; means carried by the collar for locking the collar to the outer reach member against relative longitudinal movement at selectable points along said reach member; a bearing member encircling the collar, the locking means and an adjacent portion of the outer reach member and associated with the outer reach member for angular movement with respect thereto; said bearing member being formed with an opening providing for access to the locking means in the collar.

8. A vehicle comprising first and second transverse axles; longitudinal reach means between said axles including longitudinal inner and outer, telescopic and relatively angularly movable reach members; means securing the outer reach member to the first axle; means securing the inner reach member to the second axle; a collar carried by the outer reach member for adjustment longitudinally of said reach member; means for securing said collar and outer reach member against relative longitudinal movement at selectable points along said reach member; bearing means carried by said collar for angular movement with respect to the outer reach member; and means cooperable with the collar and bearing means for limiting relative angular movement between the two.

GORDON G. McNAMARA, Jr.